(12) United States Patent
Osborne et al.

(10) Patent No.: US 11,718,815 B2
(45) Date of Patent: Aug. 8, 2023

(54) POWDER DETERGENT COMPOSITION

(71) Applicant: FIRMENICH SA, Satigny (CH)

(72) Inventors: Murray Osborne, Satigny (CH); Arnaud Struillou, Satigny (CH)

(73) Assignee: FIRMENICH SA, Satigny (CH)

( * ) Notice: Subject to any disclaimer, the term of this patent is extended or adjusted under 35 U.S.C. 154(b) by 0 days.

(21) Appl. No.: 17/052,015

(22) PCT Filed: Sep. 18, 2019

(86) PCT No.: PCT/EP2019/075046
§ 371 (c)(1),
(2) Date: Oct. 30, 2020

(87) PCT Pub. No.: WO2020/064467
PCT Pub. Date: Apr. 2, 2020

(65) Prior Publication Data
US 2021/0155880 A1    May 27, 2021

(30) Foreign Application Priority Data
Sep. 26, 2018  (EP) ..................... 18196796

(51) Int. Cl.
*C11D 3/50*  (2006.01)
*C11D 3/37*  (2006.01)
(Continued)

(52) U.S. Cl.
CPC .............. *C11D 3/505* (2013.01); *C11D 1/831* (2013.01); *C11D 3/128* (2013.01); *C11D 3/222* (2013.01);
(Continued)

(58) Field of Classification Search
CPC ..... C11D 3/505; C11D 11/0017; C11D 1/831; C11D 3/3769
See application file for complete search history.

(56) References Cited

U.S. PATENT DOCUMENTS 4,844,828 A * 7/1989 Aoki .................. C08F 8/48
525/61
4,869,843 A * 9/1989 Saito ................. C11D 3/10
252/186.25

(Continued)

FOREIGN PATENT DOCUMENTS

GN  101960007 A  1/2011
WO  2012075293 A2  6/2012

(Continued)

OTHER PUBLICATIONS

International Search Report and Written Opinion for corresponding PCT/EP2019/075046 dated Dec. 11, 2019, 12 pages.

*Primary Examiner* — Liam J Heincer
*Assistant Examiner* — M. Reza Asdjodi
(74) *Attorney, Agent, or Firm* — Armstrong Teasdale LLP

(57) ABSTRACT

Described herein is a powder detergent composition including a detergent active material including at least a surfactant system, and a granulated powder. The granulated powder includes particles made of: (a) a water soluble polymer matrix, and (b) an oil phase including a perfume dispersed in the water soluble polymer matrix, the oil being at least partly encapsulated in microcapsules. The granulated powder includes up to 30% by weight of encapsulated oil based on the total weight of the powder.

20 Claims, 1 Drawing Sheet

(51) Int. Cl.
  *C11D 17/06*   (2006.01)
  *C11D 11/00*   (2006.01)
  *C11D 1/831*   (2006.01)
  *C11D 3/12*   (2006.01)
  *C11D 3/22*   (2006.01)
  *C11D 3/386*   (2006.01)
  *C11D 3/39*   (2006.01)
  *C11D 1/22*   (2006.01)
  *C11D 1/72*   (2006.01)

(52) U.S. Cl.
  CPC .......... *C11D 3/3703* (2013.01); *C11D 3/3769* (2013.01); *C11D 3/38609* (2013.01); *C11D 3/38627* (2013.01); *C11D 3/38636* (2013.01); *C11D 3/38645* (2013.01); *C11D 3/3932* (2013.01); *C11D 3/3942* (2013.01); *C11D 11/0017* (2013.01); *C11D 17/06* (2013.01); *C11D 1/22* (2013.01); *C11D 1/72* (2013.01)

(56) References Cited

U.S. PATENT DOCUMENTS

| | | | | |
|---|---|---|---|---|
| 6,001,789 A | * | 12/1999 | Trinh | A61L 9/01 510/101 |
| 2002/0147124 A1 | * | 10/2002 | Klos | C11D 11/0023 510/447 |
| 2005/0153135 A1 | * | 7/2005 | Popplewell | C11D 3/373 428/402.2 |
| 2009/0217463 A1 | * | 9/2009 | Souter | C12N 9/20 8/137 |
| 2010/0298193 A1 | * | 11/2010 | Tjelta | C11D 3/10 510/224 |
| 2011/0097369 A1 | * | 4/2011 | Sunder | C11D 3/505 510/513 |
| 2011/0118166 A1 | * | 5/2011 | Tjelta | C11D 17/0056 510/219 |
| 2011/0190191 A1 | | 8/2011 | Balgobind-Narain et al. | |
| 2012/0028869 A1 | * | 2/2012 | Crawford | A47K 7/03 510/143 |
| 2012/0165239 A1 | * | 6/2012 | Dreja | C11D 3/505 510/299 |
| 2014/0073030 A1 | * | 3/2014 | Jones | A23K 10/14 435/188 |
| 2016/0346752 A1 | * | 12/2016 | Struillou | C11D 3/505 |
| 2017/0015949 A1 | * | 1/2017 | Johnson | C11D 3/38636 |
| 2017/0107455 A1 | * | 4/2017 | Frankenbach | A61L 2/23 |
| 2017/0107462 A1 | * | 4/2017 | Frankenbach | D06M 23/02 |
| 2017/0349865 A1 | * | 12/2017 | Zerhusen | C11D 3/373 |
| 2020/0087598 A1 | * | 3/2020 | Struillou | C11D 3/505 |
| 2021/0022969 A1 | * | 1/2021 | Yeung | A61Q 19/10 |
| 2021/0155880 A1 | * | 5/2021 | Osborne | C11D 3/3769 |

FOREIGN PATENT DOCUMENTS

| | | |
|---|---|---|
| WO | 2016054351 A1 | 4/2016 |
| WO | 2016144798 A1 | 9/2016 |
| WO | 2018172514 A1 | 9/2018 |

* cited by examiner

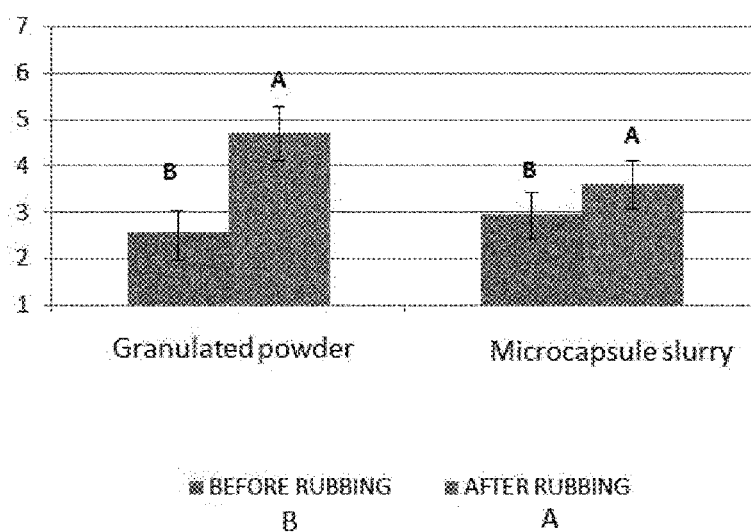

POWDER DETERGENT COMPOSITION

CROSS-REFERENCE TO RELATED APPLICATIONS

This application is a U.S. National Phase Application of International Patent Application No. PCT/EP2019/075046, filed Sep. 18, 2019, which claims the benefit of priority to European Patent Application No. 18196796.9, filed Sep. 26, 2018, the entire contents of each of which are hereby incorporated by reference herein.

TECHNICAL FIELD

The present invention relates to the field of powder detergent compositions. More particularly, the present invention describes a powder detergent composition comprising a detergent active material comprising a surfactant system and a granulated powder comprising particles having a low perfume loading, i.e granulated powder comprising up to 30% by weight of encapsulated oil.

BACKGROUND OF THE INVENTION

Fragrances play an important role in the perception of consumer product performance and thus they often determine the consumer's choice for a given product.

In detergents, hard surface cleaners or personal- or body-care products, the fragrances are incorporated as a free oil and/or encapsulated in microcapsules in order to deliver a pleasant odor to the fabrics, to the surfaces or to the skin.

One main advantage of encapsulated fragrance is that fragrance performance and the long-lasting of the olfactive perception during and after application, (e.g. after rinsing and drying of the skin or the fabrics) is enhanced.

However, when perfume microcapsules are used, other properties must be taken into account to provide a consumer product with a good quality. Indeed, when incorporated into a consumer product base, perfume microcapsules are often in an "aggressive" environment and must therefore exhibit a good stability with low perfume leakage. Furthermore, depending on the type of consumer product, microcapsules can be subjected to high mechanical stresses during the mixing phase with the base and have therefore to exhibit good mechanical properties.

It would be therefore interesting to provide a granulated powder having not only good performance in terms of stability and olfactive performance but that can also survive a manufacturing process requiring high shearing.

The powder detergent composition of the invention solves this problem as it comprises granulated powder containing particles made of a polymeric matrix and encapsulated oil according to optimized relative proportions that prevents particle abrasion during the manufacturing process.

SUMMARY OF THE INVENTION

A first object of the invention is a powder detergent composition comprising:
  a detergent active material comprising at least a surfactant system,
  a granulated powder comprising particles made of:
  a) a water soluble polymer matrix,
  b) an oil phase comprising a perfume dispersed in said polymer matrix, said oil being at least partly encapsulated in microcapsules,
  wherein
    the granulated powder comprises up to 30% by weight of encapsulated oil based on the total weight of the powder.

A second object of the invention is a process for preparing a powder detergent composition as defined above comprising the step of mixing the granulated powder with the detergent active material as defined above.

FIGURES

FIG. 1 represents the olfactive performance in a powder detergent of the granulated powder according to the present invention (i.e comprising encapsulated perfume oil) compared to a directly added microcapsule slurry.

DETAILED DESCRIPTION OF THE INVENTION

Unless stated otherwise, percentages (%) are meant to designate percent by weight of a composition.

When referring to "particles" or "granulated powder", percentages (%) are given for the dried composition.

The present invention has now determined a way to improve the mechanical resistance of the granulated powder when subjected to high shearing conditions during the manufacturing process of a powder detergent.

Indeed, a first object of the invention is a powder detergent composition comprising:
  a detergent active material comprising at least one surfactant system,
  a granulated powder comprising particles made of:
    a) a water soluble polymer matrix,
    b) an oil phase comprising a perfume dispersed in said polymer matrix, said oil being at least partly encapsulated in microcapsules,
  wherein
    the granulated powder comprises up to 30% by weight of encapsulated oil based on the total weight of the powder.

The powder detergent composition of the invention should be understood as a composition comprising a surfactant system capable of washing fabrics. By contrast, a solid scent booster (i.e solid perfumed beads) is devoid of any surfactant system and is not considered as a powder detergent composition according to the invention.

According to an embodiment, the powder detergent as defined in the present invention does not comprise solid scent booster perfume beads.

Detergent Active Material

The detergent active material comprises at least one surfactant system.

The surfactant system may comprise at least one surfactant chosen in the group consisting of anionic, nonionic, cationic, zwiterionic surfactant and mixtures thereof.

The surfactant in the detergent active material is preferably chosen in the group consisting of linear alkyl benzene sulphonate (LABS), sodium laureth sulphate, sodium lauryl ether sulphate (SLES), sodium lauryl sulphate (SLS), alpha olefin sulphonate (AOS), methyl ester sulphonates (MES), alkyl polyglyucosides (APG), primary alcohol ethoxylates and in particular lauryl alcohol ethoxylates (LAE), primary alcohol sulphonates (PAS), soap and mixtures thereof.

The detergent active material may comprise a further component, commonly used in powder detergent compositions, selected from the group consisting of bleaching agents, buffering agent; builders; soil release or soil suspension polymers; granulated enzyme particles, corrosion inhibitors, antifoaming, sud suppressing agents; dyes, fillers, and mixtures thereof.

According to a particular embodiment, the detergent active material comprises:
a) from 5 to 50% by weight, preferably from 5 to 30% of a surfactant, preferably chosen in the group consisting of anionic surfactants and nonionic surfactants;
b) from 10 to 50% by weight of a filler, preferably chosen in the group consisting of sodium silicate, sodium sulfate and mixture thereof;
c) from 10-30% by weight of a builder, preferably chosen in the group of zeolites, sodium carbonate and mixture thereof;
d) from 0-2% by weight of an enzyme, preferably chosen in the group cellulase, lipase, protease, mannanase, pectinase and mixtures thereof;
e) from 0-2% by weight of a free perfume
f) from 0-20% by weight of a source of hydrogen peroxide, preferably sodium percarbonate or sodium perborate, more preferably sodium percarbonate, and
g) from 0-5% by weight of a bleach activator, preferably TAED (tetraacetylethylenediamine)
based on the total weight of the composition.

According to another particular embodiment, the detergent active material comprises:
(i) from 5 to 50% by weight, preferably from 5 to 30% of a surfactant, preferably chosen in the group consisting of anionic surfactants and nonionic surfactants;
(ii) from 10 to 50% by weight of a filler, preferably chosen in the group consisting of sodium silicate, sodium sulfate and mixture thereof;
(iii) from 10-30% by weight of a builder, preferably chosen in the group of zeolites, sodium carbonate and mixture thereof;
(iv) from greater than 0 to 2% by weight of an enzyme, preferably chosen in the group cellulase, lipase, protease, mannanase, pectinase and mixtures thereof;
(v) from greater than 0 to 2% by weight of a free perfume
(vi) from greater than 0 to 20% by weight of a source of hydrogen peroxide, preferably sodium percarbonate or sodium perborate, more preferably sodium percarbonate, and
(vii) from greater than 0 to 5% by weight of a bleach activator, preferably TAED based on the total weight of the composition.

Granulated Powder Comprising Particles

According to the invention, the granulated powder comprises particles made of:
a) a water soluble polymer matrix,
b) an oil phase comprising a perfume dispersed in said polymer matrix, said oil being at least partly encapsulated in microcapsules.

Water Soluble Polymer Matrix

Any water soluble polymer can be used for the purpose of the invention. Preferably, the water soluble polymer has emulsifying properties.

A "water soluble polymer" is intended for the purpose of the present invention as encompassing any polymer which forms a one-phase solution in water. Preferably, it forms a one phase solution when dissolved in water at concentrations as high as 20% by weight, more preferably even as high as 50% by weight. Most preferably it forms a one phase solution when dissolved in water at any concentration.

Examples of water soluble polymer as defined in the present invention are starch, modified starch, maltodextrins, polysaccharides, carbohydrates, chitosan, gum arabic, polyethylene glycol, polyvinyl pyrrolidone, polyvinyl alcohol, acrylamides, acrylates, polyacrylic acid and related, maleic anhydride copolymers, amine-functional polymers, vinyl ethers, styrenes, polystyrenesulfonates, vinyl acids, ethylene glycol-propylene glycol block copolymers, and mixtures thereof.

According to a particular embodiment, the water soluble polymer comprises maltodextrin having a Dextrose Equivalent (DE) comprised between 3 and 20, preferably between 10 and 18.

According to an embodiment, the water soluble polymer comprises maltodextrin 18DE and/or maltodextrin 10DE.

According to a particular embodiment, the water soluble polymer comprises maltodextrin 10DE.

According to an embodiment, granulated powder comprises at least 55% by weight of water soluble polymer based on the total weight of the powder.

According to a particular embodiment, granulated powder comprises between 55 and 95%, preferably between 60 and 85%, more preferably comprises between 70 and 80% by weight of water soluble polymer based on the total weight of the powder.

According to an embodiment, the weight ratio between the water soluble polymer and encapsulated oil within the granulated powder is comprised between 2 and 20, preferably between 3.5 and 10.

The matrix may comprise a fireproofing or explosion suppression agent. The type and concentration of such agents in spray-drying emulsions is known to the person skilled in the art. One can cite as non-limiting examples of such fireproofing or explosion suppression agents inorganic salts, $C_1$-$C_{12}$ carboxylic acids, salts of $C_1$-$C_{12}$ carboxylic acids and mixtures thereof. Preferred explosion suppression agents are, salicylic acid, acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, tartaric acid, ascorbic acid, the potassium, calcium and/or sodium salts of any of the afore-mentioned acids, and mixtures of any of these.

Oil Phase Comprising a Perfume

According to the invention, the oil phase comprises a perfume.

According to a particular embodiment, the oil phase comprises a mixture of a perfume with another ingredient selected from the group consisting of nutraceuticals, cosmetics, insect control agents and biocide actives.

According to a particular embodiment, the oil phase consists of a perfume.

By "perfume oil" (or also "perfume") what is meant here is an ingredient or composition that is a liquid at about 20° C. According to any one of the above embodiments said perfume oil can be a perfuming ingredient alone or a mixture of ingredients in the form of a perfuming composition. As a "perfuming ingredient" it is meant here a compound, which is used for the primary purpose of conferring or modulating an odour. In other words such an ingredient, to be considered as being a perfuming one, must be recognized by a person skilled in the art as being able to at least impart or modify in a positive or pleasant way the odor of a composition, and not just as having an odor. For the purpose of the present invention, the perfume oil also includes the combination of perfuming ingredients with substances which together improve, enhance or modify the delivery of the perfuming ingredients, such as perfume precursors, emulsions or dispersions, as well as combinations which impart an additional benefit beyond that of modifying or imparting an odor, such as long-lasting, blooming, malodour counteraction, antimicrobial effect, microbial stability or insect control.

The nature and type of the perfuming ingredients present in the oil phase do not warrant a more detailed description here, which in any case would not be exhaustive, the skilled person being able to select them on the basis of its general knowledge and according to intended use or application and the desired organoleptic effect. In general terms, these perfuming ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds.

The perfuming ingredients may be dissolved in a solvent of current use in the perfume industry. The solvent is preferably not an alcohol. Examples of such solvents are diethyl phthalate, isopropyl myristate, Abalyn® (rosin resins, available from Eastman), benzyl benzoate, ethyl citrate, limonene or other terpenes, or isoparaffins. Preferably, the solvent is very hydrophobic and highly sterically hindered, like for example Abalyn® or benzyl benzoate.

Encapsulated Oil in Microcapsules within the Water Soluble Polymer Matrix

According to the invention, the oil phase is dispersed within the water soluble polymer matrix and has at least one part that is encapsulated in at least one microcapsule.

According to the invention, "encapsulated oil" refers to oil that is encapsulated in a microcapsule.

By contrast, according to the invention, "non-encapsulated oil" refers to oil that is simply entrapped (or dispersed) within the polymer matrix but that is not encapsulated in a microcapsule.

The nature of the polymeric shell of the microcapsules of the invention can vary. As non-limiting examples, the shell can be made of a material selected from the group consisting of polyurea, polyurethane, polyamide, polyacrylate, polysiloxane, polycarbonate, polysulfonamide, urea formaldehyde, melamine formaldehyde resin, melamine formaldehyde resin cross-linked with polyisocyanate or aromatic polyols, melamine urea resin, melamine glyoxal resin, gelatin/gum arabic shell wall, and mixtures thereof.

According to an embodiment, the shell of the microcapsule is based on melamine formaldehyde resin or melamine formaldehyde resin cross-linked with at least one polyisocyanate or aromatic polyols.

The shell can also be a hybrid, namely organic-inorganic such as a hybrid shell composed of at least two types of inorganic particles that are cross-linked, or yet a shell resulting from the hydrolysis and condensation reaction of a polyalkoxysilane macro-monomeric composition.

According to an embodiment, the shell comprises an aminoplast copolymer, such as melamine-formaldehyde or urea-formaldehyde or cross-linked melamine formaldehyde or melamine glyoxal.

According to a particular embodiment, the core-shell microcapsules are cross-linked melamine formaldehyde microcapsules obtainable by a process comprising the steps of:

1) admixing a perfume oil with at least a polyisocyanate having at least two isocyanate functional groups to form an oil phase;
2) dispersing or dissolving into water one or more aminoplast resin(s) and optionally a stabilizer to form a water phase;
3) adding the oil phase to the water phase to form an oil-in-water dispersion, wherein the mean droplet size is comprised between 1 and 100 microns, by admixing the oil phase and the water phase;
4) performing a curing step to form the wall of said microcapsule; and
5) optionally drying the final dispersion to obtain a dried core-shell microcapsule;

This process is described in more details in WO 2013/092375 and WO 2015/110568, the contents of which are included by reference.

According to another embodiment the shell is polyurea-based made from, for example but not limited to isocyanate-based monomers and amine-containing crosslinkers such as guanidine carbonate and/or guanazole. Preferred polyurea-based microcapsules comprise a polyurea wall which is the reaction product of the polymerisation between at least one polyisocyanate comprising at least two isocyanate functional groups and at least one reactant selected from the group consisting of an amine (for example a water soluble guanidine salt and guanidine); a colloidal stabilizer or emulsifier; and an encapsulated perfume. However, the use of an amine can be omitted.

According to another embodiment, the shell is polyurethane-based made from, for example but not limited to polyisocyanate and polyols, polyamide, polyester, etc.

According to a particular embodiment the colloidal stabilizer includes an aqueous solution of between 0.1% and 0.4% of polyvinyl alcohol, between 0.6% and 1% of a cationic copolymer of vinylpyrrolidone and of a quaternized vinylimidazole (all percentages being defined by weight relative to the total weight of the colloidal stabilizer). According to another embodiment, the emulsifier is an anionic or amphiphilic biopolymer preferably chosen from the group consisting of polyacrylate (and copolymers especially with acrylamide), gum arabic, soy protein, gelatin, sodium caseinate and mixtures thereof.

According to a particular embodiment, the polyisocyanate is an aromatic polyisocyanate, preferably comprising a phenyl, a toluyl, a xylyl, a naphthyl or a diphenyl moiety. Preferred aromatic polyisocyanates are biurets and polyisocyanurates, more preferably a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N).

According to a particular embodiment, the polyisocyanate is a trimethylol propane-adduct of xylylene diisocyanate (commercially available from Mitsui Chemicals under the tradename Takenate® D-110N).

The preparation of an aqueous dispersion/slurry of core-shell microcapsules is well known from a skilled person in the art. In one aspect, said microcapsule wall material may comprise any suitable resin and especially including melamine, glyoxal, polyurea, polyurethane, polyamide, polyester, etc. Suitable resins include the reaction product of an aldehyde and an amine, suitable aldehydes include, formaldehyde and glyoxal. Suitable amines include melamine, urea, benzoguanamine, glycoluril, and mixtures thereof. Suitable melamines include, methylol melamine, methylated methylol melamine, imino melamine and mixtures thereof. Suitable ureas include, dimethylol urea, methylated dimethylol urea, urea-resorcinol, and mixtures thereof. Suitable materials for making may be obtained from one or more of the following companies Solutia Inc. (St Louis, Mo. U.S.A.), Cytec Industries (West Paterson, N.J. U.S.A.), Sigma-Aldrich (St. Louis, Mo. U.S.A.).

According to a particular embodiment, the core-shell microcapsule is a formaldehyde-free capsule. A typical process for the preparation of aminoplast formaldehyde-free microcapsules slurry comprises the steps of:

1) preparing an oligomeric composition comprising the reaction product of, or obtainable by reacting together
   a) a polyamine component in the form of melamine or of a mixture of melamine and at least one $C_1$-$C_4$ compound comprising two $NH_2$ functional groups;
   b) an aldehyde component in the form of a mixture of glyoxal, a $C_{4-6}$ 2,2-dialkoxy-ethanal and optionally a glyoxalate, said mixture having a molar ratio glyoxal/$C_{4-6}$ 2,2-dialkoxy-ethanal comprised between 1/1 and 10/1; and
   c) a protic acid catalyst;

2) preparing an oil-in-water dispersion, wherein the droplet size is comprised between 1 and 600 um, and comprising:
   i. an oil;
   ii. a water medium
   iii. at least an oligomeric composition as obtained in step 1;
   iv. at least a cross-linker selected amongst
      A) $C_4$-$C_{12}$ aromatic or aliphatic di- or tri-isocyanates and their biurets, triurets, trimmers, trimethylol propane-adduct and mixtures thereof; and/or
      B) a di- or tri-oxiran compounds of formula

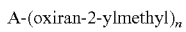

wherein n stands for 2 or 3 and 1 represents a $C_2$-$C_6$ group optionally comprising from 2 to 6 nitrogen and/or oxygen atoms;
   v. optionally a $C_1$-$C_4$ compounds comprising two $NH_2$ functional groups;

3) heating said dispersion;
4) cooling said dispersion.

This process is described in more details in WO 2013/068255, the content of which is included by reference.

According to another embodiment, the shell of the microcapsule is polyurea- or polyurethane-based. Examples of processes for the preparation of polyurea- and polyureathane-based microcapsule slurry are for instance described in WO2007/004166, EP 2300146, EP2579976 the contents of which is also included by reference. Typically a process for the preparation of polyurea- or polyurethane-based microcapsule slurry include the following steps:
   a) dissolving at least one polyisocyanate having at least two isocyanate groups in an oil to form an oil phase;
   b) preparing an aqueous solution of an emulsifier or colloidal stabilizer to form a water phase;
   c) adding the oil phase to the water phase to form an oil-in-water dispersion, wherein the mean droplet size is comprised between 1 and 500 μm, preferably between 5 and 50 μm;
   d) applying conditions sufficient to induce interfacial polymerisation and form microcapsules in form of a slurry.

According to an embodiment, no amine is added at any stage of the process.

According to the invention, it should be understood that, after encapsulation, whatever the nature of the microcapsule(s), the internal core of the capsule is only made of the core oil composed of a perfume oil.

The particles defined in the present invention can contain microcapsules which can vary by the core perfume oil inside them and/or by the wall (different chemistries or same chemistries but different process parameters like cross-linking temperature or duration).

According to a particular embodiment of the invention, the microcapsules have an outer coating selected from the group consisting of a non-ionic polysaccharide, a cationic polymer and mixtures thereof.

Such coating will help drive capsule deposition and retention on substrate during the wash process so that a significant part of the capsules which have not been broken in the wash phase/upon lathering would transfer to the substrate (skin, hair fabrics) and be available for perfume release when the capsules are broken upon rubbing after drying.

Non-ionic polysaccharide polymers are well known to a person skilled in the art. Preferred non-ionic polysaccharides are selected from the group consisting of locust bean gum, xyloglucan, guar gum, hydroxypropyl guar, hydroxypropyl cellulose and hydroxypropyl methyl cellulose, and mixtures thereof.

Cationic polymers are also well known to a person skilled in the art. Preferred cationic polymers have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination. The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 3.5M Dalton, more preferably between 50,000 and 2M Dalton.

According to a particular embodiment, one will use cationic polymers based on acrylamide, methacrylamide, N-vinylpyrrolidone, quaternized N,N-dimethylaminomethacrylate, diallyldimethylammonium chloride, quaternized vinylimidazole (3-methyl-1-vinyl-1H-imidazol-3-ium chloride), vinylpyrrolidone, acrylamidopropyltrimonium chloride, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. Preferably copolymers shall be selected from the group consisting of polyquaternium-5, polyquaternium-6, polyquaternium-7, polyquaternium 10, polyquaternium-11, polyquaternium-16, polyquaternium-22, polyquaternium-28, polyquaternium-43, polyquaternium-44, polyquaternium-46, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride, and mixtures thereof.

As specific examples of commercially available products, one may cite Salcare® SC60 (cationic copolymer of acrylamidopropyltrimonium chloride and acrylamide, origin: BASF) or Luviquat®, such as the PQ 11N, FC 550 or Style (polyquaternium-11 to 68 or quaternized copolymers of vinylpyrrolidone origin: BASF), or also the Jaguar® (C13S or C17, origin Rhodia).

Granulated powder defined in the present invention comprises up to 30%, preferably up to 25%, more preferably up to 20% by weight of encapsulated oil based on the total weight of the powder leading robust particles having a large amount of water soluble polymer matrix.

According to the invention, granulated powder comprises between 3 and 30%, preferably between 5 and 25%, more preferably between 5 and 20% by weight of encapsulated oil based on the total weight of the powder.

It was found that such granulated powder with a relatively low loading up to 30%, preferably up to 25%, more preferably up to 20% by weight of encapsulated oil based on the total weight of the powder are best suited to survive an high shear industrial manufacturing process of mixing them with the detergent powder formulation as the low loading of encapsulated oil/high loading of water-soluble polymer matrix helps reduce granule and microcapsule breakage upon processing.

As a result, particles can be used in a cost-effective way as only a low dosage of such particles is needed thanks to limited breakage upon industrial processing.

Thus, the present invention provides a powder detergent that is efficient and that can survive a manufacturing process requiring high-shearing.

According to a particular embodiment, the totality of the oil phase comprised in the granulated powder is encapsulated.

Optionally Non-Encapsulated Oil within the Water Soluble Polymer Matrix

According to an embodiment, the oil phase comprises at least one part that is not encapsulated.

By "non-encapsulated oil", it should be understood that the oil phase is not encapsulated in a microcapsule but is simply entrapped within the water soluble polymer matrix.

According to this embodiment, granulated powder comprises up to 45%, preferably up to 35% by weight of the total amount of the oil phase based on the total weight of the powder.

According to an embodiment, granulated powder comprises between 3 and 45%, preferably between 5 and 35% by weight of the oil phase based on the total weight of the powder.

According to an embodiment, granulated powder comprises between 0.1 and 40%, preferably between 10 and 30% by weight of non-encapsulated oil based on the total weight of the powder.

According to a particular embodiment, the composition comprises
(i) from 10 to 99.9%, preferably from 50 to 99.9%, by weight of a detergent active material,
(ii) from 0.1 to 90%, preferably from 0.1 to 50%, more preferably from 0.1 to 20%, even more preferably from 0.1% and 10% by weight of granulated powder based on the total weight of the composition.

Process for Preparing the Granulated Powder

There are several alternatives to the method for the preparation of the granulated powder as defined in the invention.

Indeed, there is no limitation regarding the way to obtain the dried particles provided that a low fragrance loading can be obtained.

Among those methods, one may cite for example the spray-drying that is well-known method for the encapsulation of fragrances.

Thus, according to an embodiment, the composition comprises spray-dried particles.

Therefore, according to an embodiment, the composition contains granulated powder comprising spray-dried particles obtained by a process comprising the following steps:
(i) Preparing a water phase comprising a water soluble polymer,
(ii) Optionally, preparing an oil phase comprising a perfume; and mixing the oil phase with the water phase to obtain an emulsion;
(iii) Mixing the water phase of step (i) or the emulsion of step (ii) with a microcapsule slurry comprising at least a microcapsule having an oil-based core comprising a perfume and a polymeric shell; and
(iv) Spray-drying the slurry of step (iii) to obtain a spray-dried particle,
characterized in that the granulated powder comprises up to 30% by weight of encapsulated oil based on the total weight of the powder.

An anticaking agent like silica can be added during step (iii) and/or step (iv) and/or after step (iv) of the process described above.

However, one may cite also other drying method such as the extrusion, plating, spray granulation, the fluidized bed, or even a drying at room temperature.

Another object of the invention is a process for preparing a powder detergent composition as defined above comprising the step of mixing the granulated powder with the detergent active material as defined above.

Before mixing the granulated powder with the detergent active material(s), said detergent active material is preferably provided in a solid form and can be obtained by spray drying or by dry blending the detergent active materials (initially in a solid and/or liquid and/or paste form) to obtain a solid mixture.

The invention will now be further described by way of examples. It will be appreciated that the invention as claimed is not intended to be limited in any way by these examples.

EXAMPLES

Example 1

Preparation of Granulated Powder Used in Compositions of the Present Invention

1. Synthesis of the Melamine-Formaldehyde Microcapsules Containing a Perfume Oil (Microcapsules 1)

TABLE 1

Composition of slurry of core-shell microcapsules 1

| Ingredient | [%] |
|---|---|
| Oil Phase | 30.9 |
| Perfume oil $^{a)}$ | 30.28 |
| trimethylol propane adduct of xylylene diisocyanate$^{1)}$ | 0.62 |
| Water phase | 69.1 |
| Acrylamide and acrylic acid copolymer$^{2)}$ | 4.7 |
| Melamine-formaldehyde resins$^{3)}$ | 2.45$^{3)}$ |
| Water | 50.55 |
| Sodium hydroxide | 0.5 |
| Acetic acid | 0.2 |
| acrylamidopropyltrimonium chloride/acrylamide copolymer $^{4)}$ | 10.7 |
| Total | 100 |
| Ratio of pure melamine/formaldehyde resins to perfume oil $^{5)}$ | 0.057 |

TABLE 1-continued

Composition of slurry of core-shell microcapsules 1

| Ingredient | [%] |
|---|---|

[1]) See table 1a) (perfume A)
[2]) Takenate ® D110N (75% active solution in ethyl acetate)
[3]) Alcapsol from Ciba, 20% solution in water
[4]) 90/10 blend of Cymel 385 & Cymel 9370 from Cytec, both 70% solution in water
[5]) Salcare SC60 from Ciba, 3% solution in water
6) = pure melamine/formaldehyde resin (70% of quantity used in[2])/quantity of perfume oil TABLE 1a)

Composition of perfume A

| Raw Materials | % in oil |
|---|---|
| Ethyl-2-methyl butyrate | 2.30% |
| Hexyl Acetate | 11.20% |
| Dihydromyrcenol | 11.20% |
| 2,4-Dimethyl-3-cyclohexene-1-carbaldehyde [1]) | 3.40% |
| Phenylethyl Acetate | 2.80% |
| Undecavertol ® [2]) | 5.60% |
| 2-méthylundécanal | 11.20% |
| Delta Damascone | 1.20% |
| Diphenyloxyde | 2.80% |
| Verdyle acetate | 28.00% |
| Lilial ® [3]) | 11.20% |
| Amyl Salicylate | 2.30% |
| Hexyl Salicylate | 6.80% |
| Total | 100% |

[1]) Origin: Firmenich SA, Geneva, Switzerland
[2]) 4-methyl-3-decen-5-ol; origin and trademark from Givaudan SA, Switzerland
[3]) 3-(4-tert-butylphenyl)-2-methylpropanal; origin and trademark from Givaudan SA, Switzerland The oil phase was prepared by admixing a polyisocyanate (trimethylol propane adduct of xylylene diisocyanate, Takenate® D-110N, origin: Mitsui Chemicals) with a core oil composed of a perfume oil (see table 1a) above). The oil phase consisted of 2% Takenate® D-110N and 98% of core oil. After encapsulation and use of the Takenate D-110N to cross-link the melamine-formaldehyde wall, the residual level of unreacted polyisocyanate in the core oil was very low and therefore the internal core of the capsule was only made of the core oil composed of a perfume oil.

To make the capsules slurry, the acrylamide and acrylic acid copolymer and the blend of the two melamine-formaldehyde resins were dissolved in water to form the water phase. Then the perfume premix oil was added into this solution and the pH was regulated to 5 with acetic acid. The temperature was raised to 90° C. for 2 hours to allow the curing of the capsules. At this point, capsules were formed, cross-linked and stable. A 3% Salcare SC60 (acrylamidopropyltrimonium chloride/acrylamide copolymer) solution in water was then added into the mixture at 80° C. and was allowed to react for 2 hours at 80° C. Then a solution of ethylene urea (50% wt in water) was added as usually done with aminoplast capsules as an agent to scavenge residual free formaldehyde. Final slurry contains about 3% w/w of ethylene urea relative to the weight of the slurry and the mixture was left to cool down to room temperature. The final pH was adjusted to 7 with sodium hydroxide.

2. Preparation of Granulated Powder Used in the Composition According to the Present Invention Emulsions A-E having the following ingredients were prepared:

TABLE 2

Composition of Emulsions A-D and composition of granulated powder A-D after spray-drying

| Ingredients | Emulsion A | Emulsion B | Emulsion C | Comparative emulsion D |
|---|---|---|---|---|
| Modified starch [1]) | 3.5% | 3.0% | 2.5% | 2.0% |
| Maltodextrin [2]) | 33.5% | 28.4% | 23.9% | 19.1% |
| Microcapsules slurry obtained in example 1.1 | 14.0% | 28.9% | 42.1% | 56.2% |
| Water | 49.0% | 39.7% | 31.5% | 22.7% |

| | Granule A | Granule B | Granule C | Comparative granule D |
|---|---|---|---|---|
| Modified starch [1]) | 7.8% | 6.7% | 5.6% | 4.9% |
| Maltodextrin [2]) | 77.9% | 66.3% | 56.0% | 44.7% |
| Microcapsules from slurry obtained in 1.1 | 12.2% | 24.9% | 36.3% | 48.4% |
| Silica | 2.1 | 2.1% | 2.1% | 2.0% |
| Fragrance loading in powder after spray-drying | 10.1% | 20.7% | 30.0% | 40.2% |

[1]) CapsulTM, Ingredion
[2]) Maltodextrin 10DE origin: Roquette
3) Maltose, Lehmann & Voss
4) Silica, Evonik

TABLE 3

Composition of Emulsion E and composition of granulated powder E after spray-drying

| Ingredients | Emulsion E |
|---|---|
| Modified starch [1]) | 12.5% |
| Maltodextrin [2]) | 0% |
| Maltose [3]) | 7.9% |
| Citric Acid | 1% |
| Tripotassium Citrate | 1.9% |
| Microcapsules slurry obtained in example 1.1 | 8.9% |
| Silica [4]) | 0% |
| Free Perfume C [5]) | 11% |
| Water | 56.9% |

| | Granule E |
|---|---|
| Modified starch [1]) | 31.6% |
| Maltodextrin [2]) | 0% |
| Maltose | 20.9% |
| Citric Acid | 2.6% |
| Tripotassium citrate | 4.9% |
| Encapsulated perfume C | 28.1% |
| Microcapsules from slurry obtained in 1.1 | 9.8% |
| Silica | 2.0% |
| Fragrance loading in powder after spray-drying | 35.8% |

[1]) CapsulTM, Ingredion
[2]) Maltodextrin 10DE origin: Roquette
[3]) Maltose, Lehmann & Voss
[4]) Silica, Evonik
[5]) see table 4

TABLE 4

Composition of Perfume C

| Component | % |
|---|---|
| ACÉTATE DE 4-(1,1-DIMÉTHYLÉTHYL)-1-CYCLOHEXYLE [1] | 14.50 |
| LINALOL BJ | 10.50 |
| LILIAL ® [2] | 10.00 |
| ISO E SUPER [3] | 10.00 |
| CITRONELLYL NITRILE | 9.00 |
| DIPHENYLOXYDE | 6.50 |
| ISOBORNYL ACETATE | 6.00 |
| BETA IONONE | 6.00 |
| TRICYCLO[5.2.1.0~2,6~]DEC-3-EN-8-YL ACETATE (A) + TRICYCLO[5.2.1.0~2,6~]DEC-4-EN-8-YL ACETATE (B) [4] | 5.50 |
| ETHER MT | 4.00 |
| HEDIONE ® [5] | 4.00 |
| GERANIOL 60 | 3.00 |
| CITRAL | 2.50 |
| ALDEHYDE C 10 | 2.50 |
| ALLYL HEPTANOATE | 2.50 |
| ETHYL METHYL-2-BUTYRATE | 1.50 |
| GERANYL ACETATE | 1.00 |
| 2,4-DIMETHYL-3-CYCLOHEXENE-1-CARBALDEHYDE [6] | 1.00 |

[1] Firmenich SA, Switzerland
[2] 3-(4-tert-butylphenyl)-2-methylpropanal, Givaudan SA, Vernier, Switzerland
[3] 1-(octahydro-2,3,8,8-tetramethyl-2-naphtalenyl)-1-ethanone, International Flavors & Fragrances, USA
[4] Firmenich SA, Switzerland
[5] Methyl dihydrojasmonate, Firmenich SA, Switzerland
[6] Firmenich SA, Switzerland Components for the polymeric matrix (Maltodextrin and Capsul™, or Capsul™, citric acid and tripotassium citrate) were added in water at 45-50° C. until complete dissolution.

For emulsion E, free perfume C was added to the aqueous phase.

Microcapsules slurry was added to the obtained mixture. Then, the resulting mixture was then mixed gently at 25° C. (room temperature).

Granulated powder were prepared by spray-drying the emulsion disclosed in tables 2 or 3 using a Sodeva Spray Dryer (Origin France), with an air inlet temperature set to 215° C. and a throughput set to 500 ml per hour. The air outlet temperature was of 105° C. The emulsion before atomization was at ambient temperature.

The fragrance oil content in the spray-dried granulated powder was measured by GC-MS using the proper calibration.

Example 3

Performance of the Granulated Powder Defined in the Present Invention in the Preparation of a Powder Detergent 1. Granulated Powder A-D and Microcapsules Slurry 1 Breakage During Processing The tests were carried out using a powder detergent having the composition defined in table 5.

TABLE 5

Powder detergent composition

| Ingredients | Part |
|---|---|
| Anionic (Linear Alkyl Benzene Sulphonates) | 20% |
| Nonionics (Alcohol Ethoxylates (5-9 ethylene oxide) | 6% |
| Builders (zeolites, sodium carbonate) | 25% |
| Silicates | 6% |
| Sodium Sulphate | 35% |
| Others (Enzymes, Polymers, Bleach) | 7.5% |
| Spray-dried granule powder A-D or microcapsules slurry 1 | 0.5% |

After the processing step, breakability in product was measured using GC-MS to quantify how much perfume had leaked out of the granulated powder capsule during mixing.

TABLE 6

Particles breakage and stability measurements for a detergent powder composition comprising granulated powder.

| Detergent powder with Granules | % Water Soluble Polymer Matrix (WSPM) in granules | % Microcapsules loading (M) in granules | Equivalent to % Fragrance loading in Granules | % Breakage/Leakage During Product Manufacture | | |
|---|---|---|---|---|---|---|
| | | | | 1 min | 5 mins | 15 mins |
| Comparative F* | — | — | — | 20 | 60 | 100 |
| Comparative D | 52 | 48 | 40 | 13 | 25 | 35 |
| C | 64 | 36 | 30 | 11 | 12 | 12 |
| B | 76 | 24 | 20 | 7 | 8 | 8 |
| A | 88 | 12 | 10 | 5 | 5 | 6 |

*microcapsules slurry 1 (0.15% of perfume oil → same as granule C)

Breakage values during product manufacture were determined as follows:

The granulated powder perfume capsules or the microcapsule slurry (comparative Sample F) were added to the detergent powder detailed in Table 5. The samples were mixed from 1 to 15 minutes using a Turbula Shaker mixer. Samples of the mixed powders were then for subsequent GC-MS (Shimadzu, Japan) analysis.

As shown in Table 6, the breakage (quoted as % perfume leakage after mixing) during the manufacturing process is significantly lower for all granules versus neat microcapsule slurry (comparative Sample F). Moreover, the lower the fragrance loading in the granulated powder, the lower the breakage during the manufacturing process.

Indeed, the above results show that when the fragrance loading is greater than 30% (typically with a fragrance loading of 40%–comparative granulated powder D), breakage during the manufacturing process is high and would lead to a poor microcapsule stability and performance in the final detergent powder composition.

Olfactive performance in the powder detergent of the granulated powder A compared to the microcapsule slurry has been also evaluated. A sensory panel was performed, panelists were asked to rate the perfume intensity on dry towels before and after rubbing using a scale between 1 (non-perceptible perfume) and 7 (very strong perfume intensity).

One can conclude from FIG. 1, that the granulated powder shows a much higher after rubbing effect than the microcapsule slurry.

The invention claimed is:

1. A powder detergent composition comprising:
   a detergent active material comprising at least a surfactant system,
   a granulated powder comprising particles made of:
   a) a water soluble polymer matrix, and
   b) an oil phase comprising a perfume dispersed in said water soluble polymer matrix, said oil being at least partly encapsulated in microcapsules,
   wherein the granulated powder comprises between 3 and 30% by weight of encapsulated oil based on the total weight of the granulated powder; and
   wherein the granulated powder comprises at least 55% by weight of the water soluble polymer matrix based on the total weight of the granulated powder.

2. The powder detergent composition according to claim 1, wherein the surfactant system comprises at least one surfactant selected from the group consisting of anionic, nonionic, cationic, zwititterionic surfactant, and mixtures thereof.

3. The powder detergent composition according to claim 2, wherein the at least one surfactant is selected from the group consisting of linear alkyl benzene sulphonate (LABS), Sodium laureth sulphate, sodium lauryl ether sulphate (SLES), sodium lauryl sulphate (SLS), alpha olefin sulphonate (AOS), methyl ester sulphonates (MES), alkyl polyglyucosides (APG), lauryl alcohol ethoxylates (LAE), primary alcohol sulphonates (PAS), soap, and mixtures thereof.

4. The powder detergent composition according to claim 1, wherein the detergent active material further comprises at least one component selected from the group consisting of bleaching agents, buffering agent; builders; soil release or soil suspension polymers; granulated enzyme particles, corrosion inhibitors, antifoaming, sud suppressing agents; dyes, fillers, and mixtures thereof.

5. The powder detergent composition according to claim 1, wherein the detergent active material comprises:
   a) from 5 to 50% by weight of a surfactant;
   b) from 10 to 50% by weight of a filler;
   c) from 10-30% by weight of a builder;
   d) from 0-2% by weight of an enzyme;
   e) from 0-2% by weight of a free perfume;
   f) from 0-20% by weight of a source of hydrogen peroxide; and
   g) from 0-5% by weight of a bleach activator,
   based on the total weight of the composition.

6. The powder detergent composition according to claim 5, wherein the detergent active material comprises:
   a) from 5-30% of the surfactant, wherein the surfactant is selected from the group consisting of anionic surfactants and nonionic surfactants.

7. The powder detergent composition according to claim 5, wherein the filler is selected from the group consisting of sodium silicate, sodium sulfate, and mixtures thereof.

8. The powder detergent composition according to claim 5, wherein the builder is selected from the group consisting of zeolites, sodium carbonate, and mixtures thereof.

9. The powder detergent composition according to claim 5, wherein the enzyme is selected from the group consisting of cellulase, lipase, protease, mannanase, pectinase, and mixtures thereof.

10. The powder detergent composition according to claim 5, wherein the source of hydrogen peroxide is sodium percarbonate or sodium perborate.

11. The powder detergent composition according to claim 1, wherein the composition comprises:
    a) from 10 to 99.9% by weight of the at least one detergent active material, and
    b) from 0.1 to 90% by weight of the granulated powder based on the total weight of the composition.

12. The powder detergent composition according to claim 1, wherein the granulated powder comprises up to 25% by weight of encapsulated oil based on the total weight of the granulated powder.

13. The powder detergent composition according to claim 1, wherein the granulated powder comprises up to 20% by weight of encapsulated oil based on the total weight of the granulated powder.

14. The powder detergent composition according to claim 1, wherein the totality of the oil phase is encapsulated.

15. The powder detergent composition according to claim 1, wherein the oil phase comprises at least one part that is not encapsulated, and wherein the granulated powder comprises up to 45% by weight of the total amount of the oil phase based on the total weight of the granulated powder.

16. The powder detergent composition according to claim 15, wherein the oil phase comprises at least one part that is not encapsulated and wherein the granulated powder comprises up to 35% by weight of the total amount of the oil phase based on the total weight of the granulated powder.

17. The powder detergent composition according to claim 1, wherein a part of the oil that is encapsulated is encapsulated in at least one microcapsule having a core-shell structure, wherein the core comprises the encapsulated oil and wherein the polymeric shell is made of a material selected from the group consisting of polyurea, polyurethane, polyamide, polyacrylate, polysiloxane, polycarbonate, polysulfonamide, urea formaldehyde, melamine formaldehyde resin, melamine formaldehyde resin cross-linked with polyisocyanate or aromatic polyols, melamine urea resin, melamine glyoxal resin, gelatin/gum arabic shell wall, and mixtures thereof.

18. The powder detergent composition according to claim 17, wherein the shell of the microcapsule is based on melamine formaldehyde resin or melamine formaldehyde resin cross-linked with at least one polyisocyanate or aromatic polyols.

19. The powder detergent composition according to claim 1, wherein the microcapsules comprise an outer coating selected from the group consisting of non-ionic polysaccharide and a cationic polymer.

20. The powder detergent composition according to claim 1, wherein the water soluble polymer is selected from the group consisting of starch, maltodextrins, polysaccharides, carbohydrates, chitosan, gum Arabic, polyethylene glycol, polyvinyl pyrrolidone, polyvinyl alcohol, acrylamides, acrylates, polyacrylic acid and related, maleic anhydride copolymers, amine-functional polymers, vinyl ethers, styrenes, polystyrenesulfonates, vinyl acids, ethylene glycol-propylene glycol block copolymers, and mixtures thereof.

* * * * *